US 9,446,661 B2

United States Patent
Kawano et al.

(10) Patent No.: US 9,446,661 B2
(45) Date of Patent: Sep. 20, 2016

(54) SADDLE-RIDE TYPE VEHICLE

(71) Applicant: HONDA MOTOR CO., LTD., Tokyo (JP)

(72) Inventors: Sunao Kawano, Wako (JP); Masataka Nakano, Wako (JP); Ikuo Hara, Wako (JP); Takeshi Shimura, Wako (JP); Junji Higashiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 873 days.

(21) Appl. No.: 13/712,035

(22) Filed: Dec. 12, 2012

(65) Prior Publication Data

US 2013/0153319 A1   Jun. 20, 2013

(30) Foreign Application Priority Data

Dec. 15, 2011 (JP) ................................. 2011-274231
May 9, 2012 (JP) ................................. 2012-107297

(51) Int. Cl.
*F02M 37/00* (2006.01)
*B60K 15/03* (2006.01)
*F02M 37/22* (2006.01)
*B62J 35/00* (2006.01)
*B62J 37/00* (2006.01)

(52) U.S. Cl.
CPC .......... *B60K 15/03006* (2013.01); *B62J 35/00* (2013.01); *B62J 37/00* (2013.01); *F02M 37/007* (2013.01); *F02M 37/0094* (2013.01); *F02M 37/22* (2013.01)

(58) Field of Classification Search
CPC ........... F02M 37/0036; F02M 37/106; F02M 37/103; F02M 37/025; F02M 37/22; F02M 37/10; B60K 15/077; B60K 15/0775; B60K 37/0777; B60K 15/03; B60K 2015/03111
USPC ......... 123/509, 468, 469, 514; 220/563, 734
See application file for complete search history.

(56) References Cited

U.S. PATENT DOCUMENTS

| | | | | | |
|---|---|---|---|---|---|
| 3,020,950 | A | * | 2/1962 | Schraivogel | B60K 15/077 137/549 |
| 3,049,171 | A | * | 8/1962 | Neuerburg | B60K 15/077 137/38 |
| 4,077,884 | A | * | 3/1978 | Naumann | B60K 15/077 123/DIG. 2 |
| 4,179,036 | A | * | 12/1979 | Pasini | B60K 15/077 137/574 |
| 4,354,521 | A | * | 10/1982 | Harde | B60K 15/077 137/571 |
| 4,453,564 | A | * | 6/1984 | Bergesio | B29C 65/02 137/574 |
| 4,638,836 | A | * | 1/1987 | Bailey | B60K 15/077 137/574 |

(Continued)

FOREIGN PATENT DOCUMENTS

JP        11-321355 A        11/1999

*Primary Examiner* — Thomas Moulis
(74) *Attorney, Agent, or Firm* — Birch, Stewart, Kolasch & Birch, LLP

(57) ABSTRACT

To enable the effective supply of fuel in a low remaining fuel condition, even in a saddle-ride vehicle with a requirement for an increased fuel tank capacity being provided within a limited amount of space. The saddle-ride vehicle includes an engine having a cylinder disposed on a crankcase; an intake system component disposed at the rear of the cylinder for sucking air into the engine; and a fuel tank disposed above the engine for storing fuel. The saddle-ride type vehicle includes a fuel suction port in a side bottom plate portion of the fuel tank for feeding fuel to the intake system component. The saddle-ride vehicle has a sub-chamber having a wall that surrounds the fuel suction port and the sub-chamber includes a fuel flow opening toward the vehicle rear.

19 Claims, 11 Drawing Sheets

(56) References Cited

U.S. PATENT DOCUMENTS

| | | | | |
|---|---|---|---|---|
| 4,708,170 A * | 11/1987 | Bailey | B60K 15/077 | 137/574 |
| 4,844,278 A * | 7/1989 | Freiwald | B60K 15/03 | 220/563 |
| 5,029,611 A * | 7/1991 | Sasaki | B60K 15/06 | 123/514 |
| 6,182,640 B1 * | 2/2001 | Nakashima | F02M 37/10 | 123/514 |
| 6,401,750 B2 * | 6/2002 | Tokunaga | B62J 35/00 | 123/509 |
| 6,408,874 B1 * | 6/2002 | Keller | B60K 15/077 | 137/573 |
| 6,651,764 B2 * | 11/2003 | Fournier | B62M 27/02 | 180/182 |
| 6,932,061 B2 * | 8/2005 | Tsuruta | B60K 15/00 | 123/468 |
| 7,418,950 B2 * | 9/2008 | Teets | F02M 37/04 | 123/509 |
| 7,429,322 B2 * | 9/2008 | Fujita | B01D 17/00 | 210/172.4 |
| 8,727,173 B2 * | 5/2014 | Schwark | B60K 15/077 | 137/574 |
| 2005/0173918 A1 * | 8/2005 | Eguchi | B62J 35/00 | 280/834 |
| 2011/0000921 A1 * | 1/2011 | Hawks | B60K 15/077 | 220/563 |
| 2011/0303689 A1 * | 12/2011 | Smirra | B60K 15/077 | 220/734 |
| 2013/0098917 A1 * | 4/2013 | Ishii | B60K 15/077 | 220/563 |

\* cited by examiner

US 9,446,661 B2

1

SADDLE-RIDE TYPE VEHICLE

CROSS-REFERENCE TO RELATED APPLICATIONS

The present application claims priority under 35 USC 119 to Japanese Patent Application No. 2011-274231 filed Dec. 15, 2011 and Japanese Patent Application No. 2012-107297 filed May 9, 2012 the entire contents of which are hereby incorporated by reference.

BACKGROUND OF THE INVENTION

1. Field of the Invention

The present invention relates to a saddle-ride type vehicle with a fuel tank disposed above an engine.

2. Description of Background Art

A sub-chamber of a fuel tank is known wherein the fuel tank is improved to effectively suck up fuel even if a low remaining fuel condition exists within the fuel tank. The fuel tank may be inclined relative to a vehicle body. See, for example, JP-A No. H11-321355. With the construction according to the JP-A No. H11-321355, when the fuel tank is in an inclined position, the fuel suction capacity of a pipe for sucking the fuel from the sub-chamber can be increased by upwardly inclining the bottom of the sub-chamber with respect to the bottom of the fuel tank. Therefore, even in a low remaining fuel condition, the fuel can be effectively sucked.

Meanwhile, in saddle-ride type vehicles, the acceleration or deceleration of the vehicle exerts an influence upon the level of the fuel within the fuel tank, and the above-described related art structure is still insufficient, particularly when the fuel remaining within the fuel tank is low. Therefore, a more effective supply of fuel is desired.

SUMMARY AND OBJECTS OF THE INVENTION

Accordingly, the present invention has been made in view of the foregoing, and an object of an embodiment of the present invention is to enable the effective supply of fuel in a low remaining fuel condition, even in a saddle-ride type vehicle requiring an increased fuel tank capacity within a limited amount of space.

In order to accomplish the above-mentioned object, according to an embodiment of the present invention, a saddle-ride type vehicle includes an engine (30) having a cylinder (32) disposed on a crankcase (31); an intake system component (41) disposed at the rear of the cylinder (32) for sucking air into the engine (30); and a fuel tank (70, 370) disposed above the engine (30) for storing fuel to be consumed by the engine (30). The saddle-ride type vehicle includes a fuel suction port (86A, 387B) in a bottom (76) of the fuel tank (70, 370) for feeding the fuel to the intake system component (41). The saddle-ride type vehicle has fuel collecting means (89) having a wall (92) that surrounds the fuel suction port (86A, 387B). The fuel collecting means (89) has a fuel flow opening (94) toward the vehicle rear.

With this construction, the saddle-ride type vehicle includes the fuel suction port in the bottom of the fuel tank disposed above the engine for feeding the fuel to the intake system component. Also, the saddle-ride type vehicle has the fuel collecting means having the wall that surrounds the fuel suction port. The fuel collecting means has the fuel flow opening toward the vehicle rear. Thus, even in the construction in which the fuel tank is disposed above the engine and

2 the amount of space is limited, when the remaining fuel is low, it is possible to cause the fuel to flow into the fuel collecting means through the opening in the rear of the fuel collecting means and accumulate in the fuel collecting means by utilizing a fluid level change caused at the time of the deceleration after acceleration of the vehicle, so that the fuel in the fuel collecting means can be supplied to the fuel suction port. Therefore, even in a low remaining fuel condition, the effective supply of fuel can be performed.

Also, in the above-described construction, the arrangement may be such that the fuel suction port (86A, 387B) is located above a lowermost end (79) of the bottom (76) of the fuel tank (70, 370), and the fuel suction port (86A, 387B) is located toward the vehicle rear with respect to the lowermost end (79).

In this case, even in the construction in which the fuel tank is disposed above the engine and the fuel suction port is located above the lowermost end of the fuel tank in order to maximize the capacity of the fuel tank within a limited amount of space, when the remaining fuel is low, it is possible to cause the fuel to flow into the fuel collecting means through the opening in the rear of the fuel collecting means and accumulate in the fuel collecting means by utilizing a fluid level change caused at the time of the deceleration after acceleration of the vehicle, so that the fuel in the fuel collecting means can be supplied to the fuel suction port. Therefore, even in a low remaining fuel condition, the effective supply of fuel can be performed.

Furthermore, according to an embodiment of the present invention, a saddle-ride type vehicle includes an engine (30) having a cylinder (32) disposed on a crankcase (31); an intake system component (41) disposed at the rear of the cylinder (32) for sucking air into the engine (30); and a fuel tank (270) disposed above the engine (30) for storing fuel to be consumed by the engine (30). The saddle-ride type vehicle includes a fuel suction port (86A) in a bottom (276) of the fuel tank (270) for feeding the fuel to the intake system component (41). The saddle-ride type vehicle has fuel collecting means (89) having a wall (92) that surrounds the fuel suction port (86A). The fuel collecting means (89) has a fuel flow opening (94) toward the vehicle front.

With this construction, the saddle-ride type vehicle includes the fuel suction port in the bottom of the fuel tank disposed above the engine for feeding the fuel to the intake system component. The saddle-ride type vehicle has the fuel collecting means having the wall that surrounds the fuel suction port. The fuel collecting means has the fuel flow opening toward the vehicle front. Thus, even in the construction in which the fuel tank is disposed above the engine and the amount of space is limited, when the remaining fuel is low, it is possible to cause the fuel to flow into the fuel collecting means through the opening in the front of the fuel collecting means and accumulate in the fuel collecting means by utilizing a fluid level change caused at the time of the acceleration after deceleration of the vehicle, so that the fuel in the fuel collecting means can be supplied to the fuel suction port. Therefore, even in a low remaining fuel condition, an effective supply of fuel can be performed.

Also, in the above-described construction, the arrangement may be such that the fuel suction port (86A) is located above a lowermost end (79) of the bottom (276) of the fuel tank (270), and the fuel suction port (86A) is located toward the vehicle front with respect to the lowermost end (79).

In this case, even in the construction in which the fuel tank is disposed above the engine and the fuel suction port is located above the lowermost end of the fuel tank in order to maximize the capacity of the fuel tank within a limited amount of space, when the remaining fuel is low, it is possible to cause the fuel to flow into the fuel collecting means through the opening in the front of the fuel collecting means and accumulate in the fuel collecting means by utilizing a fluid level change caused at the time of the acceleration after deceleration of the vehicle, so that the fuel in the fuel collecting means can be supplied to the fuel suction port. Therefore, even in a low remaining fuel condition, the effective supply of fuel can be performed.

Moreover, the arrangement may be such that the fuel collecting means (89) is provided inside with a fuel return port (87A) for return to the fuel tank (70) of residual fuel in a fuel pump (50) after operation, the fuel pump (50) sucking the fuel in the fuel tank (70) and feeding the fuel to the intake system component (41).

In this case, the residual fuel in the fuel pump is returned into the fuel collecting means through the fuel return port, thereby allowing the effective supply of fuel even in a low fuel remaining fuel condition.

Also, in the above-described construction, the arrangement may be such that the saddle-ride type vehicle has a body frame (13) below the fuel tank (70, 270, 370), the body frame (13) extending rearwardly from a head pipe (12), in which the fuel tank (70, 270, 370) is of a saddle type, the fuel tank (70, 270, 370) being disposed on the body frame (13).

In this case, even with the saddle type fuel tank disposed above the body frame extending rearwardly from the head pipe, the effective supply of fuel in a low remaining fuel condition can be performed.

Further, the arrangement may be such that the fuel collecting means (89) has a highest wall portion (92A), the wall portion (92A) being located toward the lowermost end (79) of the bottom (76, 276) of the fuel tank (70, 270, 370) in a vehicle front-rear direction.

In this case, the fuel collecting means has the highest wall portion that is located toward the lowermost end of the bottom of the fuel tank in the vehicle front-rear direction. Thus, if the fuel collecting means has the fuel flow opening toward the rear, the wall located toward the lowermost end receives the fuel changed in fluid level at the time of the deceleration after acceleration of the vehicle, thereby allowing an efficient accumulation of fuel in the fuel collecting means. If the fuel collecting means has the fuel flow opening toward the front, on the other hand, the wall located toward the lowermost end receives the fuel changed in fluid level at the time of the acceleration after deceleration of the vehicle, thereby allowing efficient accumulation of fuel in the fuel collecting means.

Moreover, the arrangement may be such that the fuel pump (50) is coupled through a pipe (54) to a pressure regulator (56) that is separate from the fuel pump (50) and the fuel after passing through the pressure regulator (56) is fed to a fuel injection device (44), while residual fuel in the pressure regulator (56) is fed to the fuel return port (87A) through the pipe (54).

In this case, the fuel pump is coupled through the pipe to the pressure regulator that is separate from the fuel pump. Also, the fuel after passing through the pressure regulator is fed to the fuel injection device, while residual fuel in the pressure regulator is fed to the fuel return port through the pipe. Thus, maintenance for the pressure regulator can be easily done and the residual fuel can be effectively returned to the fuel return port.

Also, the arrangement may be such that the fuel return port (87A), along with the fuel suction port (86A), is provided within the fuel collecting means (89), the fuel suction port (86A) being provided between the fuel return port (87A) and the lowermost end (79) of the bottom (76, 276) of the fuel tank (70, 270) in the vehicle front-rear direction.

In this case, the fuel return port, along with the fuel suction port, is provided within the fuel collecting means, the fuel suction port being provided between the fuel return port and the lowermost end of the bottom of the fuel tank in the vehicle front-rear direction. Thus, the fuel returned into the fuel collecting means through the fuel return port can be effectively supplied to the fuel suction port.

Further, the arrangement may be such that the fuel suction port (86A) is provided in a fuel pipe (86), the fuel pipe (86) being coupled to the fuel pump (50) provided below the fuel tank (70, 270), the fuel pump (50) having a pump body and a case (50A), the case (50A) containing a fuel reservoir chamber.

In this case, the fuel suction port is provided in a fuel pipe, the fuel pipe being coupled to the fuel pump provided below the fuel tank. Thus, more fuel, increased by the same amount as the volume of the fuel pump, can be accumulated in the fuel tank. Also, although if the fuel pump is fixed in the fuel tank, the shape of a fixing portion, etc. between the fuel tank and the fuel pump is restricted, the fuel pump is disposed below the fuel tank, thereby allowing greater flexibility in the shape of the fuel tank and a larger volume of the fuel tank.

Moreover, the arrangement may be such that an air bubble return port (88A) is provided in the bottom (76, 276) of the fuel tank (70, 270) outwardly of the fuel collecting means (89) for return into the fuel tank (70, 270) of air bubbles generated within the fuel reservoir chamber by the fuel pump (50).

In this case, the air bubble return port is provided in the bottom of the fuel tank outwardly of the fuel collecting means, thereby preventing the entry of the air bubbles into the fuel collecting means through the air bubble return port and allowing the effective supply of fuel to the fuel suction port.

In addition, the arrangement may be such that the fuel suction port (387B) is provided in a fuel cock (386), and the fuel collecting means (89) is elevated above a reservoir area of the fuel cock (386).

In this case, since the fuel suction port is provided in the fuel cock and the fuel collecting means is elevated above a reservoir area of the fuel cock, when the remaining fuel is low and the fuel cock is used in the reserve position, the fuel stored by the fuel collecting means elevated above the reservoir area can be supplied to the reservoir area. Therefore, even in a low remaining fuel condition, the effective supply of fuel can be performed.

Further, the arrangement may be such that the opening (94) is provided closer to the fuel return port (87A) than the fuel suction port (86A).

In this case, both of the fuel flowing into fuel collecting means through the opening and the fuel returned from the fuel return port flow in almost the same direction into the fuel suction port, thereby allowing the efficient supply of fuel to the fuel suction port.

Also, the arrangement may be such that the fuel return port (87A) is provided toward the opening (94) with respect to the fuel suction port (86A), and the fuel return port (87A) and the fuel suction port (86A) are arranged in the vehicle front-rear direction.

In this case, since the fuel return port and the fuel suction port are arranged in the vehicle front-rear direction, the flow of fuel caused by the acceleration or deceleration of the vehicle allows the efficient supply of fuel to the fuel suction port.

Additionally, the arrangement may be such that the air bubble return port (488A) is provided above the fuel collecting means (89).

In this case, the air bubble return port is provided above the fuel collecting means, thereby preventing the entry of the air bubbles into the fuel collecting means through the air bubble return port and allowing the efficient supply of fuel to the fuel suction port.

In the saddle-ride type vehicle according to an embodiment of the present invention, when the remaining fuel is low, it is possible to cause the fuel to flow into the fuel collecting means through the opening in the rear of the fuel collecting means and accumulate in the fuel collecting means by utilizing a fluid level change caused at the time of the deceleration after acceleration of the vehicle, so that the fuel in the fuel collecting means can be supplied to the fuel suction port. Therefore, even in a low remaining fuel condition, the effective supply of fuel can be performed.

Also, even in the construction in which the fuel suction port is located above the lowermost end of the fuel tank in order to maximize the capacity of the fuel tank within a limited amount of space, the effective supply of fuel can be performed.

Furthermore, when the remaining fuel is low, it is possible to cause the fuel to flow into the fuel collecting means through the opening in the front of the fuel collecting means and accumulate in the fuel collecting means by utilizing a fluid level change caused at the time of the acceleration after deceleration of the vehicle, so that the fuel in the fuel collecting means can be supplied to the fuel suction port. Therefore, even in a low remaining fuel condition, the effective supply of fuel can be performed.

Moreover, the residual fuel in the fuel pump is returned into the fuel collecting means through the fuel return port, thereby allowing the effective supply of fuel even in a low remaining fuel condition.

Also, even with the saddle type fuel tank, the effective supply of fuel in a low remaining fuel condition can be performed.

Additionally, the wall located toward the lowermost end receives the fuel changed in fluid level within the fuel tank, thereby allowing efficient accumulation in the fuel collecting means of fuel.

Further, maintenance for the pressure regulator that is separate from the fuel pump can be facilitated.

Also, the fuel return port, along with the fuel suction port, is provided within the fuel collecting means. Thus, the fuel returned into the fuel collecting means through the fuel return port can be effectively supplied to the fuel suction port.

In addition, the fuel pump is provided below the fuel tank. Thus, more fuel, increased by the same amount as the volume of the fuel pump, can be accumulated in the fuel tank.

Also, the air bubble return port is provided outside of the fuel collecting means, thereby preventing the entry of the air bubbles into the fuel collecting means through the air bubble return port and allowing the effective supply of fuel to the fuel suction port.

Moreover, since the fuel stored by the fuel collecting means elevated above the reservoir area can be supplied to the reservoir area, the effective supply of fuel can be performed even in a low remaining fuel condition.

Further, both of the fuel flowing into fuel collecting means through the opening and the fuel returned from the fuel return port flow in almost the same direction into the fuel suction port, thereby allowing the efficient supply of fuel to the fuel suction port.

Also, since the fuel return port and the fuel suction port are arranged in the vehicle front-rear direction, the flow of fuel caused by the acceleration or deceleration of the vehicle allows the efficient supply of fuel to the fuel suction port.

In addition, the entry of the air bubbles into the fuel collecting means through the air bubble return port can be prevented, thereby allowing the efficient supply of fuel to the fuel suction port.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
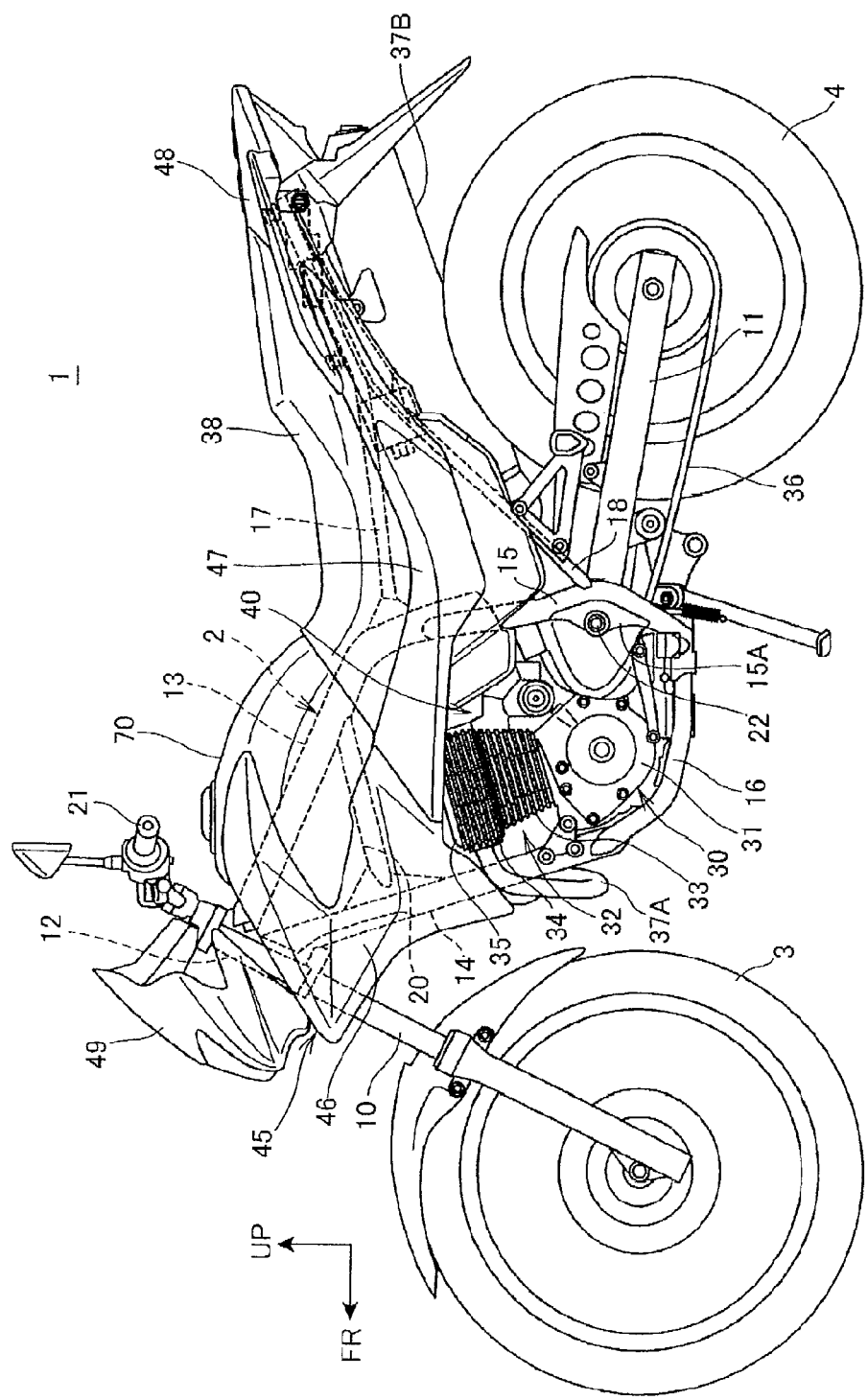
FIG. 1 is a left side view of a saddle-ride type vehicle according to a first embodiment of the present invention.

Hereinafter, a saddle-ride type vehicle according to embodiments of the present invention will be described with reference to the accompanying drawings. It is to be noted that, in the drawings used in the following description, there are shown arrow FR indicating the front of the vehicle, arrow UP indicating the upper side of the vehicle, and arrow LH indicating the left of the vehicle. In the following description, these directions are appropriately used.

FIG. 1 is a left side view of a saddle-ride type vehicle according to a first embodiment of the present invention.

As shown in FIG. 1, a motorcycle 1 (a saddle-ride type vehicle) is a saddle-ride type vehicle in which an engine 30 is disposed at the longitudinal center of a frame 2; a front fork 10 for supporting a front wheel 3 is steerably supported at a front end of the frame 2; and a swing arm 11 for supporting a rear wheel 4 is provided on a rear portion of the frame 2.

Figure 2:
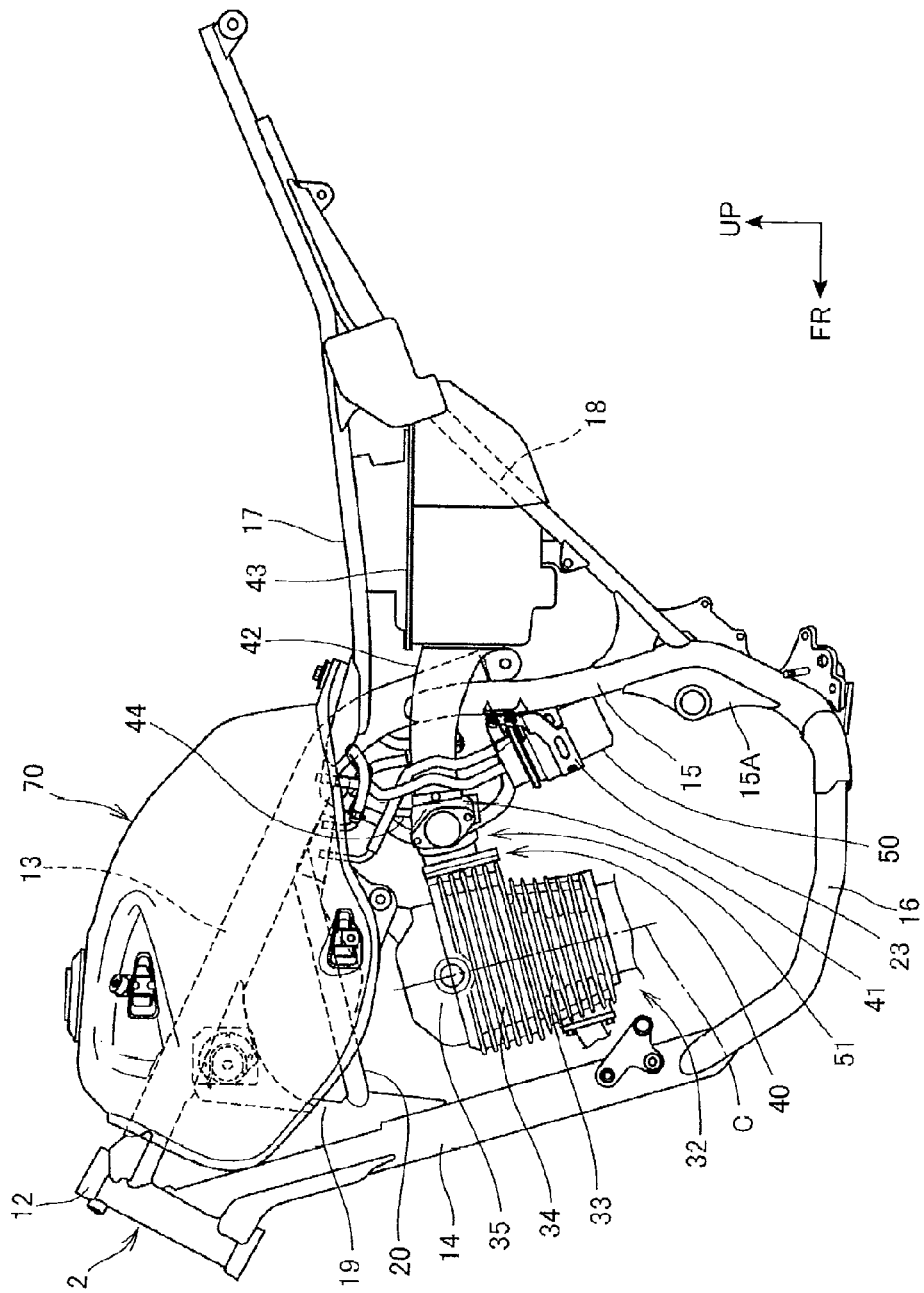
FIG. 2 is a left side view showing a body frame and its peripheral components.

FIG. 2 is a left side view showing the frame 2 and its peripheral components. It is to be noted that, in FIG. 2, a crankcase of the engine 30 is not shown.

As shown in FIGS. 1 and 2, the frame 2 is composed of a head pipe 12 that is located at a front portion of a vehicle body; a single main frame 13 (a body frame) that is inclined to extend obliquely downward toward the rear from an upper portion of the head pipe 12; a single down frame 14 that is inclined to extend obliquely downward toward the rear from a lower portion of the head pipe 12; a pair of left and right center frames 15 that branch off in a vehicle width direction from a rear end of the main frame 13 and extend downwardly; a pair of left and right underframes 16 that branch off in the vehicle width direction from a lower end of the down frame 14 and extend downwardly to be coupled to lower ends of the center frames 15; a pair of left and right seat frames 17 that extend toward a rear end of the vehicle body from a rear end of the main frame 13; and a pair of left and right sub-frames 18 that extend upwardly toward the rear from lower portions of the center frames 15 to be coupled to rear portions of the seat frames 17. Also, a reinforcing plate 19 for connecting front portions of the main frame 13 and the down frame 14 is provided on a rear portion of the head pipe 12. A reinforcing pipe 20 extends between a lower portion of the reinforcing plate 19 and the undersurface of an intermediate portion of the main frame 13.

The pair of left and light front forks 10 is turnably journaled to the head pipe 12 through a steering shaft (not shown). The front wheel 3 is journaled to lower portions of the front forks 10. A handlebar 21 is provided at an upper end of the steering shaft.

The swing arm 11 extending rearwardly is swingable with a front end thereof journaled to a pivot shaft 22. The pivot shaft 22 extending in the vehicle width direction is supported by pivot plates 15A that are provided on the center frames 15. The rear wheel 4 is journaled to a rear end of the swing arm 11. A columnar rear shock absorber (not shown) extends between a rear portion of the swing arm 11 and a rear portion of the main frame 13.

The engine 30 is a power unit with an integral transmission. The engine 30, between the down frame 14 and the center frames 15, is suspended between the main frame 13 and the down frame 14.

The engine 30 is a single-cylinder four-cycle engine, and a vertical engine with a cylinder axis C extending upward in a slightly forwardly inclined position. The engine 30 includes a crankcase 31 that contains a crankshaft (not shown) and the transmission (not shown) and a cylinder 32 that is provided on the top surface of a front portion of the crankcase 31. The cylinder 32 has a cylinder block 33, a cylinder head 34, and a head cover 35 in this order from the bottom.

An output shaft (not shown) of the engine 30 is provided on the left surface of a rear portion of the crankcase 31. The rear wheel 4 is driven by a drive chain 36 that extends between the above-described output shaft and a side of the rear wheel 4.

An exhaust pipe 37A is connected to a front portion of the cylinder head 34. The exhaust pipe 37A extends downwardly, and then is bent and extends rearwardly along the right side surface to be connected to a muffler 37B that is disposed to the right of the seat frame 17.

An intake system 40 for the sucking of air into the cylinder head 34 is connected to a rear portion of the cylinder head 34. The intake system 40 includes a throttle body 41 that is connected to an intake port in a rear portion of the cylinder head 34; a connecting tube 42 that extends rearwardly from the throttle body 41 (an intake system component); and an air cleaner box 43 that is disposed below the seat frames 17 to the rear of the center frames 15 to take in fresh air. The throttle body 41 is provided with a fuel injection device 44 for injecting fuel into the throttle body 41.

The throttle body 41 is disposed between the cylinder head 34 and the center frames 15. The connecting tube 42 passes laterally to the center frames 15 and extends rearwardly of the center frames 15 to be connected to a front surface of the air cleaner box 43.

A fuel tank 70 that stores fuel to be consumed by the engine 30 is located above the cylinder 32 and the throttle body 41, and extends longitudinally along the main frame 13. The fuel tank 70 is supported by the main frame 13.

A fuel pump 50 that sucks in the fuel from the fuel tank 70 to feed it to the fuel injection device 44 is disposed below the throttle body 41 and the connecting tube 42 and fixed to the front surface of a vertically intermediate portion of the left-hand center frame 15 through a stay 23.

A seat 38 for a rider is supported on the seat frames 17. The seat 38 is continuous with a rear portion of the fuel tank 70 and extends rearwardly.

The frame 2 is covered with a plastic body cover 45 that is divided into individual portions. The body cover 45 includes a pair of left and right shrouds 46 that cover the fuel tank 70 from the front and the down frame 14 from above; a pair of left and right side covers 47 that are continuous with the shrouds 46 and extend rearwardly below the seat 38; a rear fender 48 that covers the rear wheel 4 from above; and a front cover 49 that covers the head pipe 12 from the front.

Figure 3:
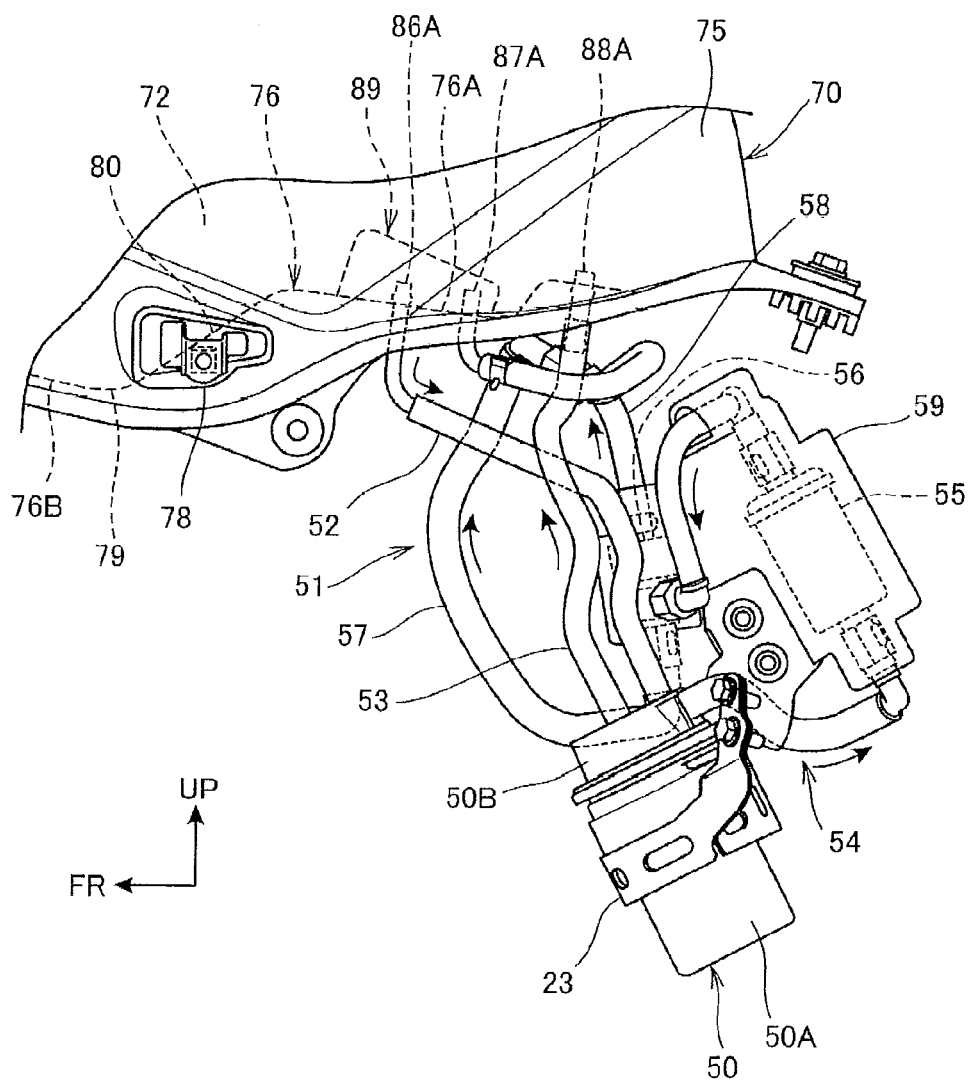
FIG. 3 is a side view showing the connection between a fuel tank and a fuel pump.

FIG. 3 is a side view showing the connection between the fuel tank 70 and the fuel pump 50.

As shown in FIG. 3, the fuel pump 50 is connected to the fuel tank 70 through plural tubes 51 that extend from lower surfaces of the fuel tank 70. More specifically, the tubes 51 have a fuel-supply tube 52 that supplies the fuel in the fuel tank 70 to the fuel pump 50; an air bubble return tube 53 that returns air bubbles in the fuel from the fuel pump 50 to the fuel tank 70; and a fuel delivery tube (a pipe) 54 that delivers the fuel increased in pressure by the fuel pump 50. The fuel delivery tube 54, partway along its length, is provided with, in order from upstream, a fuel filter 55 and a pressure regulator 56 that controls the pressure of fuel to a predetermined pressure. The fuel delivery tube 54 divides into two directions from the pressure regulator 56, and has a fuel tube 57 for connecting the pressure regulator 56 to the fuel injection device 44 and a fuel return tube 58 for connecting the pressure regulator 56 to the fuel tank 70. The fuel filter 55 and the pressure regulator 56 are integrally housed within a case body 59 and fixed on the vehicle body through the case body 59. Since the fuel filter 55 is provided outside of the fuel pump 50, it is only necessary to remove the fuel filter 55 at the time of maintenance for the fuel filter 55, thereby allowing easy maintenance.

As indicated by arrows in FIG. 3, the fuel in the fuel tank 70 is sucked off through the fuel-supply tube 52 by the fuel pump 50 and increased in pressure. And then the fuel passes through the fuel delivery tube 54 to the fuel filter 55 and the pressure regulator 56 in this order and is pressure-controlled by the pressure regulator 56 to be supplied to the fuel injection device 44 (FIG. 2). The fuel discharged from the pressure regulator 56 at the time of pressure control passes through the fuel return tube 58 and is returned into the fuel tank 70. The air bubbles generated in a fuel reservoir chamber located within the fuel pump 50 pass through the air bubble return tube 53 and are returned into the fuel tank 70.

The fuel pump 50 has a cylindrical case 50A that is closed at a lower end and contains the fuel reservoir chamber; and a housing 50B for closing an upper end of the case 50A. Within the case 50A, a pump body (not shown) of the fuel pump 50 is supported by the housing 50B. The fuel-supply tube 52 is connected to the housing 50B.

Figure 4:
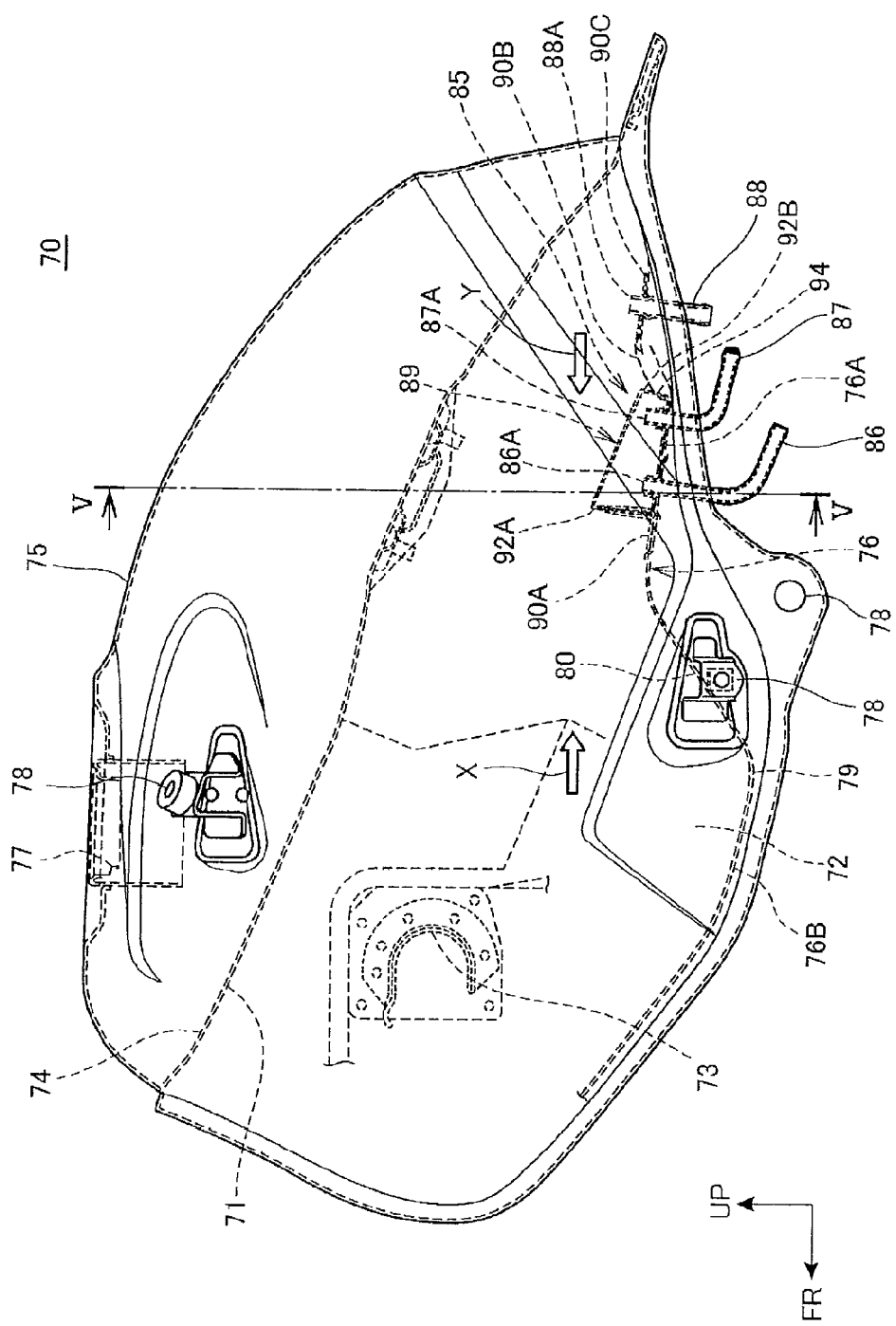
FIG. 4 is a left side view of the fuel tank.
Figure 5:
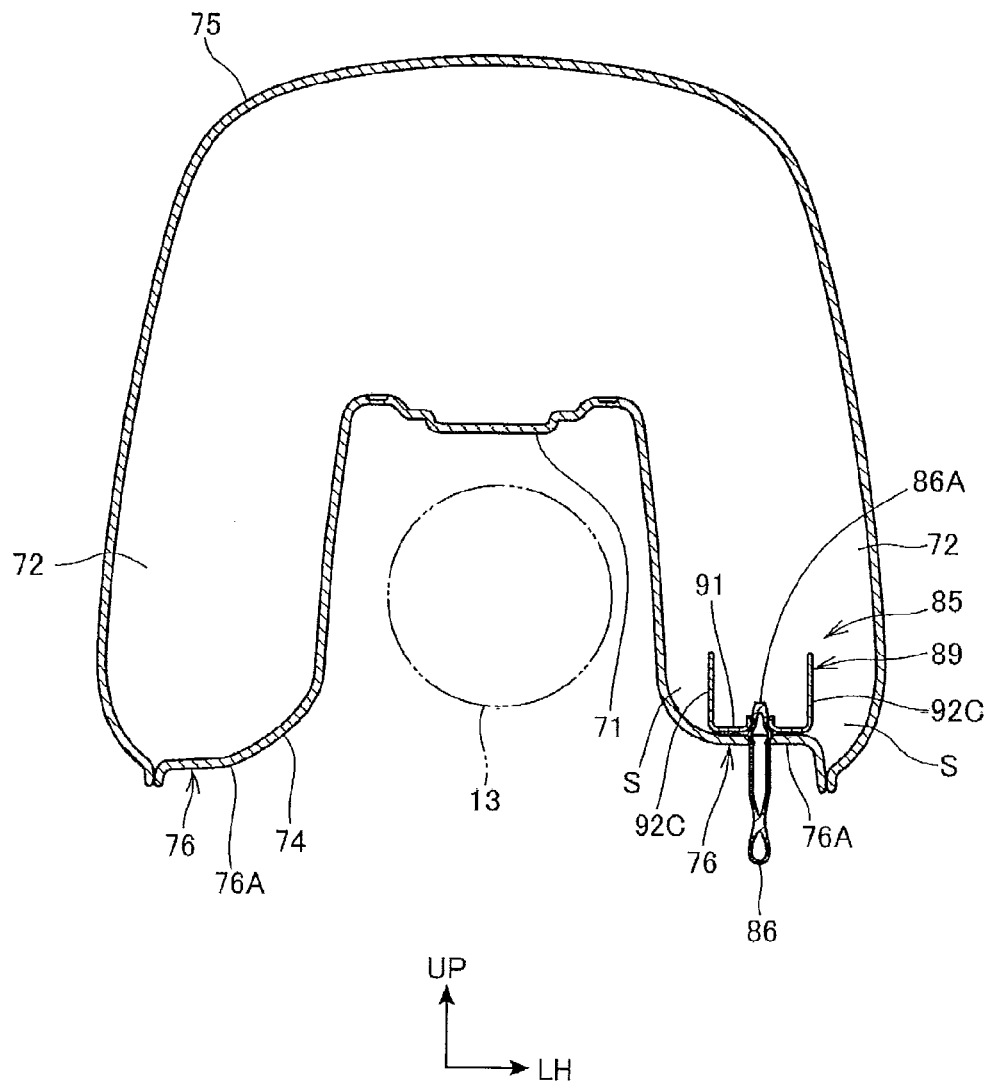
FIG. 5 is a sectional view taken along line V-V of FIG. 4.

FIG. 4 is a left side view of the fuel tank 70. FIG. 5 is a sectional view taken along line V-V of FIG. 4.

As shown in FIGS. 4 and 5, the fuel tank 70 is a saddle type tank that has an upwardly-recessed frame-avoiding portion 71 on a bottom thereof. The frame-avoiding portion 71 has left and right side reservoir portions 72 for storing fuel in tank side portions. The fuel tank 70 is disposed in such a manner that the main frame 13 passes through the frame-avoiding portion 71. The left and right side reservoir portions 72 are disposed in such a manner as to straddle the main frame 13. In the rear of the frame-avoiding portion 71 inclined downwardly toward the rear, the left and right side reservoir portions 72 are connected to each other so as to permit movement of fuel toward the left and right. An engagement portion 73 that is adapted to engage a protrusion (not shown) of the main frame 13 is formed on a side surface of the frame-avoiding portion 71.

The fuel tank 70 is made of metal. The fuel tank 70 is formed by welding a container-shaped outer surface portion 75 constituting the side and upper surfaces of the fuel tank 70 to a peripheral edge of a bottom plate 74 constituting the bottom of the fuel tank 70. The bottom plate 74 has the frame-avoiding portion 71 in the center in the vehicle width direction, and, to the left and right of the frame-avoiding portion 71, side bottom plate portions (a fuel tank bottom) 76 constituting the bottoms of the side reservoir portions 72. A filler opening 77 is formed in the upper surface of a front portion of the outer surface portion 75. Also, the outer surface portion 75 is provided with a plurality of fixing portions 78 to which the body cover 45 is fixed.

As shown in FIGS. 2 and 4, in order to maximize the capacity of the fuel tank 70, the bottom plate 74 of the fuel tank 70 is formed so that it conforms to the shapes of components disposed below the fuel tank 70. More specifically, rear bottom plate portions 76A of the side bottom plate portions 76 located above the throttle body 41 are located at a higher position than the front bottom plate portions 76B of the side bottom plate portions 76 located above the head cover 35 because the throttle body 41 including the fuel injection device 44 needs layout space up to a higher position than the head cover 35 of the engine 30. In other words, according to this embodiment, the front bottom plate portions 76B of the side bottom plate portions 76 extend downwardly below the rear bottom plate portions 76A, thereby forming lowermost ends 79 of the side reservoir portions 72 on the front bottom plate portions 76B and ensuring large capacity of the fuel tank 70. The rear bottom plate portions 76A are made continuous with the lowermost ends 79 by an inclined surface 80 that is inclined downwardly toward the front.

A fuel tube connection 85 for connecting the tubes 51 extending from the fuel pump 50 to the fuel tank 70 is provided on the rear bottom plate portion 76A of the left-hand reservoir portion 72.

Figure 6:
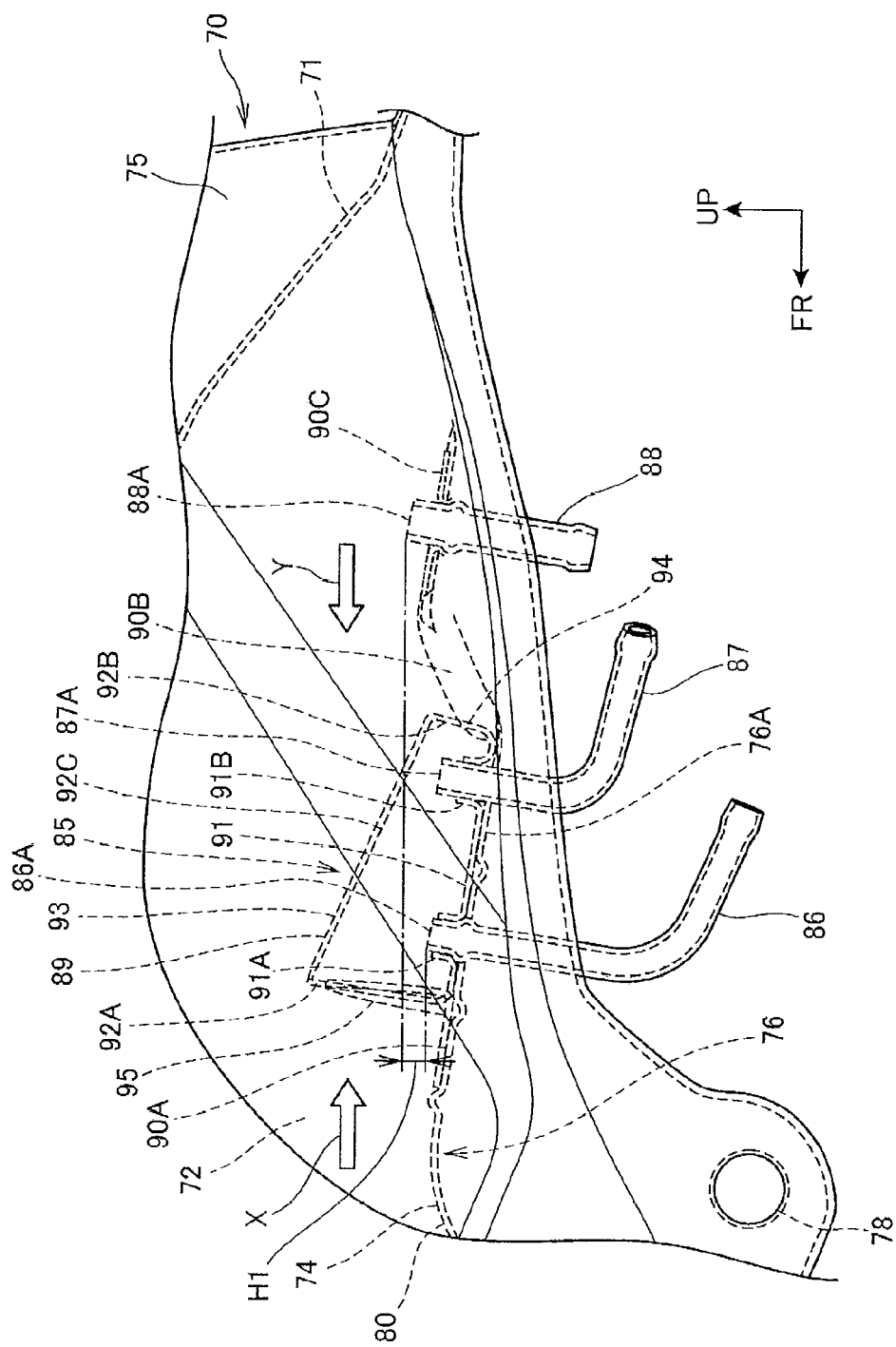
FIG. 6 is a left side view of a fuel tube connection.
Figure 7:
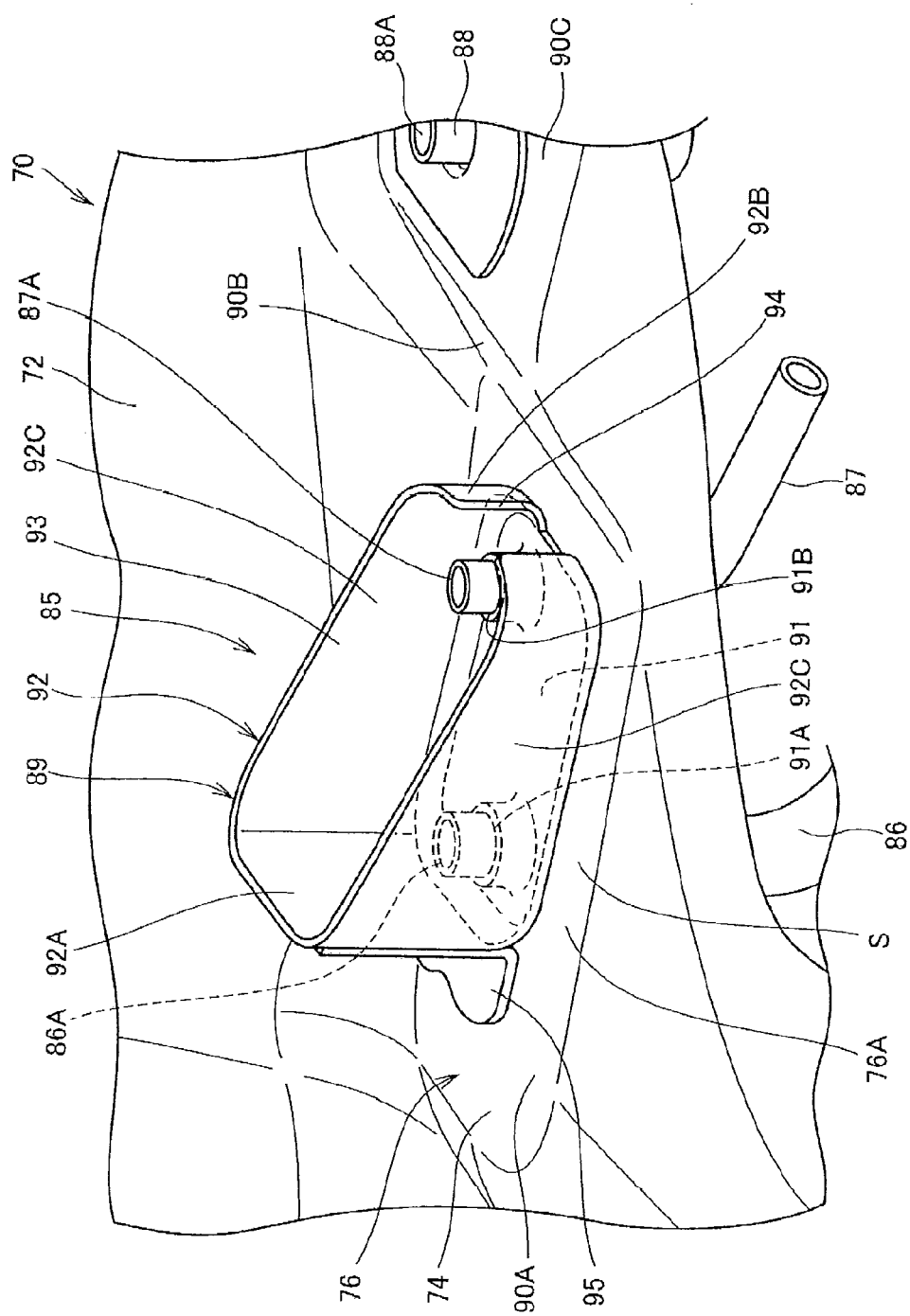
FIG. 7 is a perspective view of the fuel tube connection as viewed from the left rear.

FIG. 6 is a left side view of the fuel tube connection 85. FIG. 7 is a perspective view of the fuel tube connection 85 as viewed from the left rear.

As shown in FIGS. 6 and 7, the fuel tube connection 85 includes a fuel-supply tube connecting pipe 86 (a fuel pipe) that is provided at a front portion of the rear bottom plate portion 76A for connecting the fuel-supply tube 52 (FIG. 3); a fuel return tube connecting pipe 87 that is disposed at the rear of the fuel-supply tube connecting pipe 86 for connecting the fuel return tube 58 (FIG. 3); an air bubble return tube connecting pipe 88 that is disposed at the rear of the fuel return tube connecting pipe 87 for connecting the air bubble return tube 53 (FIG. 3); and a sub-chamber 89 (fuel collecting means) that surrounds the fuel-supply tube connecting pipe 86 and the fuel return tube connecting pipe 87. The fuel-supply tube connecting pipe 86, the fuel return tube connecting pipe 87, and the air bubble return tube connecting pipe 88 are metal pipes inserted from below into holes in the rear bottom plate portion 76A, the pipes being welded in the respective holes.

The rear bottom plate portion 76A has an inclined portion 90A that is inclined downwardly toward the rear from a rear end of the inclined surface 80; an inclined portion 90B that is inclined upwardly toward the rear from a rear end of the inclined portion 90A; and an inclined portion 90C that is inclined downwardly toward the rear from a rear end of the inclined portion 90B. The fuel-supply tube connecting pipe 86, the fuel return tube connecting pipe 87, and the sub-chamber 89 are provided on the inclined portion 90A, while the air bubble return tube connecting pipe 88 is provided on the inclined portion 90C.

Figure 8A:
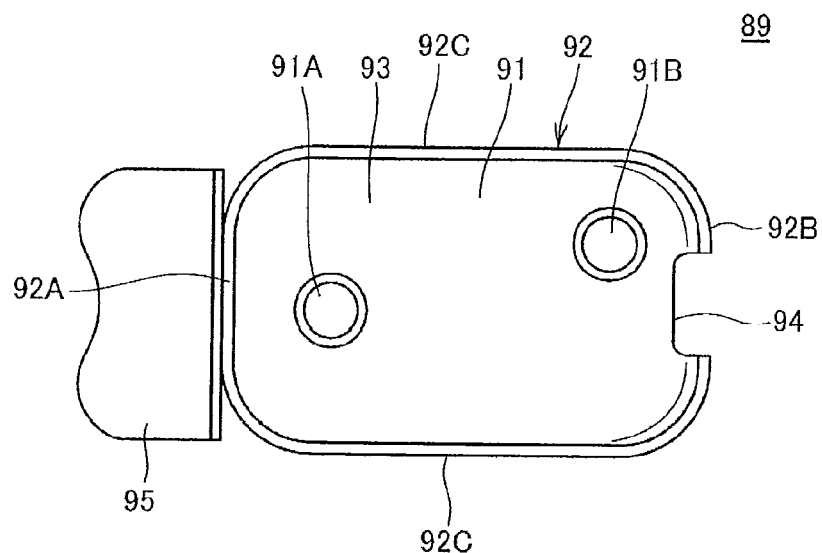
FIGS. 8(*a*) and 8(*b*) are views showing a sub-chamber, in which 8(*a*) is a plan view, and 8(*b*) is a side view.
Figure 8B:
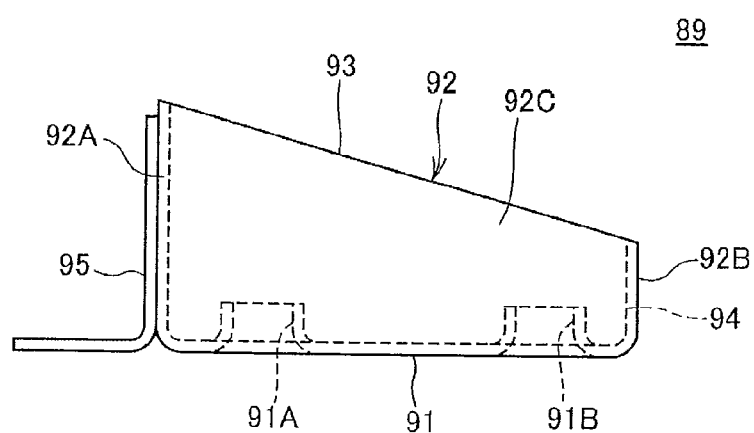

FIGS. 8(*a*) and 8(*b*) are views showing the sub-chamber 89, in which 8(*a*) is a plan view, and 8(*b*) is a side view.

As shown in FIGS. 6 to 8(*b*), the sub-chamber 89 is formed in open-topped box shape, and has a bottom plate portion 91 of substantially rectangular shape in a plan view which abuts on the rear bottom plate portion 76A; a wall 92 that upstands from a peripheral edge of the bottom plate portion 91; and an opening portion 93 that opens upwardly.

The bottom plate portion 91 is formed with a fixing hole 91A into which the fuel-supply tube connecting pipe 86 is inserted, and a fixing hole 91B into which the fuel return tube connecting pipe 87 is inserted. The fixing holes 91A and 91B are provided with edges raised by a burring process, thereby ensuring contact areas of the fixing holes 91A and 91B with the fuel-supply tube connecting pipe 86 and the fuel return tube connecting pipe 87, respectively.

The wall 92 has a front wall 92A (a wall portion located toward the lowermost end) that is located toward the lowermost end 79 in a vehicle front-rear direction; a rear wall 92B that is located at the rear of the front wall 92A and opposed to the front wall 92A; and a pair of left and right sidewalls 92C that each connect the front wall 92A and the rear wall 92B.

The front wall 92A is the highest of the walls constituting the wall 92, and formed higher than the rear wall 92B. The upper edges of the sidewalls 92C are inclined downwardly toward the rear so as to connect the upper edges of the front wall 92A and the rear wall 92B.

An opening 94 (a fuel flow opening) formed by cutting away a portion of the rear wall 92B is formed in the center in the vehicle width direction of the rear wall 92B to allow the fuel at the rear of the sub-chamber 89 to flow into the sub-chamber 89 through the opening 94.

A stay piece 95 is joined to a front portion of the sub-chamber 89. The stay piece 95 is formed in generally L shape so that the stay piece 95 abuts on the front wall 92A and the rear bottom plate portion 76A. With the stay piece 95 and the bottom plate portion 91 welded to the rear bottom plate portion 76A, the sub-chamber 89 is fixed in the fuel tank 70.

As shown in FIG. 5, the sub-chamber 89 is not fully provided across the width of the side reservoir portion 72. Space S is provided between the sidewalls 92C of the sub-chamber 89 and the inner wall of the fuel tank 70 for allowing fuel to flow forward of and to the rear of the sub-chamber 89.

The upper end of the fuel-supply tube connecting pipe 86 serves as a fuel suction port 86A for feeding fuel from the fuel tank 70 to the fuel pump 50. The fuel suction port 86A is provided within the sub-chamber 89 toward the front and protrudes upwardly of the bottom plate portion 91. The fuel suction port 86A is located at the widthwise center of the sub-chamber 89.

In this embodiment, since the fuel tank 70 is of a saddle type straddling the main frame 13, the left and right side reservoir portions 72 are small in width. For this reason, it is difficult to provide the fuel pump 50 at the bottom within the fuel tank 70. In view of this, the fuel suction port 86A is provided in the rear bottom plate portion 76A, and the fuel pump 50 disposed outside of the fuel tank 70 is connected to the fuel suction port 86A. Thus, in a low remaining fuel condition, the fuel accumulated on the bottom of the fuel tank 70 can be sucked by the fuel pump 50. Also, the fuel pump 50 is not a build-in type, and therefore the capacity of the fuel tank 70 can be increased.

The upper end of the fuel return tube connecting pipe 87 serves as a fuel return port 87A for returning fuel from the fuel pump 50 to the fuel tank 70. The fuel return port 87A is provided within the sub-chamber 89 toward the rear and protrudes upwardly of the bottom plate portion 91. The fuel return port 87A is disposed toward the sidewall 92C on the inside to avoid the opening 94, so as not to interfere with the flow of fuel through the opening 94. Furthermore, the fuel return port 87A, along with the fuel suction port 86A, is provided within the sub-chamber 89. Thus, the fuel returned into the sub-chamber 89 through the fuel return port 87A can be efficiently returned back into the fuel suction port 86A.

The upper end of the air bubble return tube connecting pipe 88 serves as an air bubble return port 88A for returning air bubbles from the fuel reservoir chamber of the fuel pump 50 to the fuel tank 70. The air bubble return port 88A is provided in the inclined portion 90C outwardly and rearwardly of the sub-chamber 89 and protrudes upwardly of the inclined portion 90C. The air bubble return port 88A is disposed outside of the sub-chamber 89 away from the fuel suction port 86A. Thus, it is possible to prevent the air bubbles returned through the air bubble return port 88A from being sucked into the fuel suction port 86A. Also, as shown in FIG. 6, since the air bubble return port 88A is located predetermined height H1 above the fuel suction port 86A, the air bubbles returned through the air bubble return port 88A is less likely to be sucked into the fuel suction port 86A.

If there is plenty of fuel in the fuel tank 70, the area of the fuel suction port 86A is filled with fuel, and therefore the fuel can be sucked through the fuel suction port 86A. On the other hand, if the remaining fuel is low, when the fuel tank 70 is inclined together with the vehicle or the vehicle is accelerated or decelerated, the level of fuel within the fuel tank 70 moves and the fuel might become less likely to be sucked through the fuel suction port 86A. In view of the foregoing, in this embodiment, the sub-chamber 89 is provided, thereby collecting and holding the fuel in the sub-chamber 89 and allowing the efficient suction of fuel through the fuel suction port 86A even in a low remaining fuel condition. In other words, the sub-chamber 89 serves as fuel collecting means for collecting and holding fuel in a low remaining fuel condition.

When the motorcycle 1 is accelerated in a state in which the fuel remaining within the fuel tank 70 is low, the fuel moves rearwardly as indicated by arrow X in FIGS. 4 and 6, and consequently the fluid level in the rear of the side reservoir portions 72 is raised. Then the fuel moves forward in the direction of arrow Y in response to the end of acceleration or the deceleration. A portion of the fuel moved forward flows into the sub-chamber 89 through the opening 94 or the opening portion 93 of the sub-chamber 89 and accumulates in the sub-chamber 89. In this manner, when the remaining fuel is low, it is possible to cause the fuel to flow into the sub-chamber 89 through the opening 94 in the rear of the sub-chamber 89 and accumulate in the sub-chamber 89 by utilizing a fluid level change caused at the time of the deceleration after acceleration of the motorcycle 1, so that the fuel in the sub-chamber 89 can be supplied to the fuel suction port 86A. Therefore, even in a low remaining fuel condition, the effective supply of fuel to the fuel pump 50 can be performed.

In the case of traditional fuel tanks having a flat bottom, the sub-chamber can be easily provided on the fuel tank bottom. In saddle-ride type vehicles, however, it is difficult to make the fuel tank bottom flat because there is a need for an increased fuel tank capacity within a limited amount of space. This makes it difficult to provide the sub-chamber at such location as to facilitate the suction of fuel, leading to difficulties in the effective supply of fuel in a low remaining fuel condition. In view of such circumstances, in this embodiment, the lowermost end 79 is extended downwardly below the fuel suction port 86A, thereby ensuring the largest possible capacity of the fuel tank 70. This causes, in a low fuel condition, accumulation of fuel in the lowermost ends 79 of the side reservoir portions 72. However, it is possible to cause the fuel at the lowermost ends 79 to flow into the sub-chamber 89 by utilizing a fluid level change caused by the end of acceleration or the deceleration of the motorcycle 1, so that the fuel below the fuel suction port 86A can be also effectively utilized. Therefore, in a low remaining fuel condition, the effective supply of fuel can be performed.

Further, in the wall 92 of the sub-chamber 89, the front wall 92A located toward the lowermost end 79 is the highest. Thus, the front wall 92A receives the fuel that moves forward in response to a fluid level change caused by the end of acceleration or the deceleration of the motorcycle 1, thereby allowing efficient accumulation in the sub-chamber 89 of fuel.

As described above, according to the first embodiment to which the present invention is applied, the motorcycle 1 includes the fuel suction port 86A in the side bottom plate portion 76 of the side reservoir portion 72 of the fuel tank 70 that is disposed above the engine 30, for feeding fuel to the fuel pump 50. The motorcycle 1 has the sub-chamber 89 having the wall 92 that surrounds the fuel suction port 86A. The sub-chamber 89 has the fuel flow opening 94 toward the vehicle rear. Thus, even in the construction in which the fuel tank 70 is disposed above the engine 30 and the amount of space is limited, when the remaining fuel is low, it is possible to cause the fuel to flow into the sub-chamber 89 through the opening 94 in the rear of the sub-chamber 89 and accumulate in the sub-chamber 89 by utilizing a fluid level change caused at the time of the deceleration after acceleration of the vehicle, so that the fuel in the sub-chamber 89 can be supplied to the fuel suction port 86A. Therefore, even in a low remaining fuel condition, the effective supply of fuel can be performed.

Furthermore, the fuel suction port 86A is located above the lowermost end 79 of the side bottom plate portion 76 of the fuel tank 70, toward the vehicle rear with respect to the lowermost end 79. Thus, even in the construction in which the fuel tank 70 is disposed above the engine 30 and the fuel suction port 86A is located above the lowermost end 79 of the fuel tank 70 in order to maximize the capacity of the fuel tank 70 within a limited amount of space, when the remaining fuel is low, it is possible to cause the fuel to flow into the sub-chamber 89 through the opening 94 in the rear of the sub-chamber 89 and accumulate in the sub-chamber 89 by utilizing a fluid level change caused at the time of the deceleration after acceleration of the vehicle. Therefore, even in a low remaining fuel condition, the effective supply of fuel can be performed.

Moreover, residual fuel in the fuel pump 50 is returned into the sub-chamber 89 through the fuel return port 87A, thereby allowing the effective supply of fuel even in a low remaining fuel condition.

Also, even with the saddle type fuel tank 70 disposed above the main frame 13 extending rearwardly from the head pipe 12, the effective supply of fuel in a low remaining fuel condition can be performed.

Furthermore, the sub-chamber 89 has the wall 92 surrounding the fuel suction port 86A, in which the front wall 92A located toward the lowermost end 79 of the side bottom plate portion 76 of the fuel tank 70 in the vehicle front-rear direction is the highest. Thus, the front wall 92A located toward the lowermost end 79 receives the fuel changed in fluid level at the time of the deceleration after acceleration of the motorcycle 1, thereby allowing efficient accumulation in the sub-chamber 89 of fuel.

Additionally, the fuel pump 50 is coupled through the fuel delivery tube 54 to the pressure regulator 56 that is provided separately from the fuel pump 50. The fuel after passing through the pressure regulator 56 is fed to the fuel injection device 44, and the residual fuel in the pressure regulator 56 is fed to the fuel return port 87A through the fuel return tube 58 of the fuel delivery tube 54. Thus, maintenance for the pressure regulator 56 can be easily done and the residual fuel can be effectively returned to the fuel return port 87A.

Further, the fuel return port 87A, along with the fuel suction port 86A, is provided within the sub-chamber 89. The fuel suction port 86A is provided between the fuel return port 87A and the lowermost end 79 of the side bottom plate portion 76 of the fuel tank 70 in the vehicle front-rear direction. Thus, the fuel returned into the sub-chamber 89 through the fuel return port 87A can be effectively supplied to the fuel suction port 86A.

Moreover, the fuel suction port 86A is provided in the fuel-supply tube connecting pipe 86. The fuel-supply tube connecting pipe 86 is coupled to the fuel pump 50, the fuel pump 50 having the pump body and the case 50A and being provided below the fuel tank 70. Thus, more fuel, increased by the same amount as the volume of the fuel pump 50, can be accumulated in the fuel tank 70. Also, although if the fuel pump is fixed in the fuel tank, the shape of the fixing portion, etc. between the fuel tank and the fuel pump is restricted, the fuel pump 50 is disposed below the fuel tank 70, thereby allowing greater flexibility in the shape of the fuel tank 70 and a larger volume of the fuel tank 70.

In addition, the air bubble return port 88A is provided in the side bottom plate portion 76 of the fuel tank 70, outside of the sub-chamber 89, thereby preventing the entry of air bubbles from the air bubble return port 88A into the sub-chamber 89, and allowing the effective supply of fuel to the fuel suction port 86A.

Furthermore, the opening 94 is provided closer to the fuel return port 87A than the fuel suction port 86A. Both of the fuel flowing into the sub-chamber 89 through the opening 94 and the fuel returned from the fuel return port 87A flow in almost the same direction into the fuel suction port 86A, thereby allowing the efficient supply of fuel to the fuel suction port 86A.

Moreover, the fuel return port 87A and the fuel suction port 86A are arranged in the vehicle body front-rear direction. Thus, the flow of fuel caused by the acceleration or deceleration of the vehicle allows the efficient supply of fuel to the fuel suction port 86A.

It should be understood that the above-described first embodiment is given to illustrate an aspect to which the present invention is applied, and the present invention is not limited to this embodiment.

While, in the above-described first embodiment, the motorcycle 1 is given as an example of the saddle-ride type vehicle, the present invention is not limited thereto, but also can be applied to three-wheeled saddle-ride type vehicles or saddle-ride type vehicles having four wheels or more.

Hereinafter, a second embodiment to which the present invention is applied will be described with reference to FIG. 9, in which the same elements as the first embodiment are denoted by the same reference signs, and the description thereof will not be repeated.

In the above-described first embodiment, the fuel suction port 86A is located toward the vehicle rear with respect to the lowermost end 79 of the fuel tank 70, and the sub-chamber 89 has the fuel flow opening 94 toward the vehicle rear. On the other hand, in the second embodiment, the fuel suction port 86A is located toward the vehicle front with respect to the lowermost end 79 of a fuel tank 270, and the sub-chamber 89 has the fuel flow opening 94 toward the vehicle front. This is where the second embodiment differs from the first embodiment.

Figure 9:
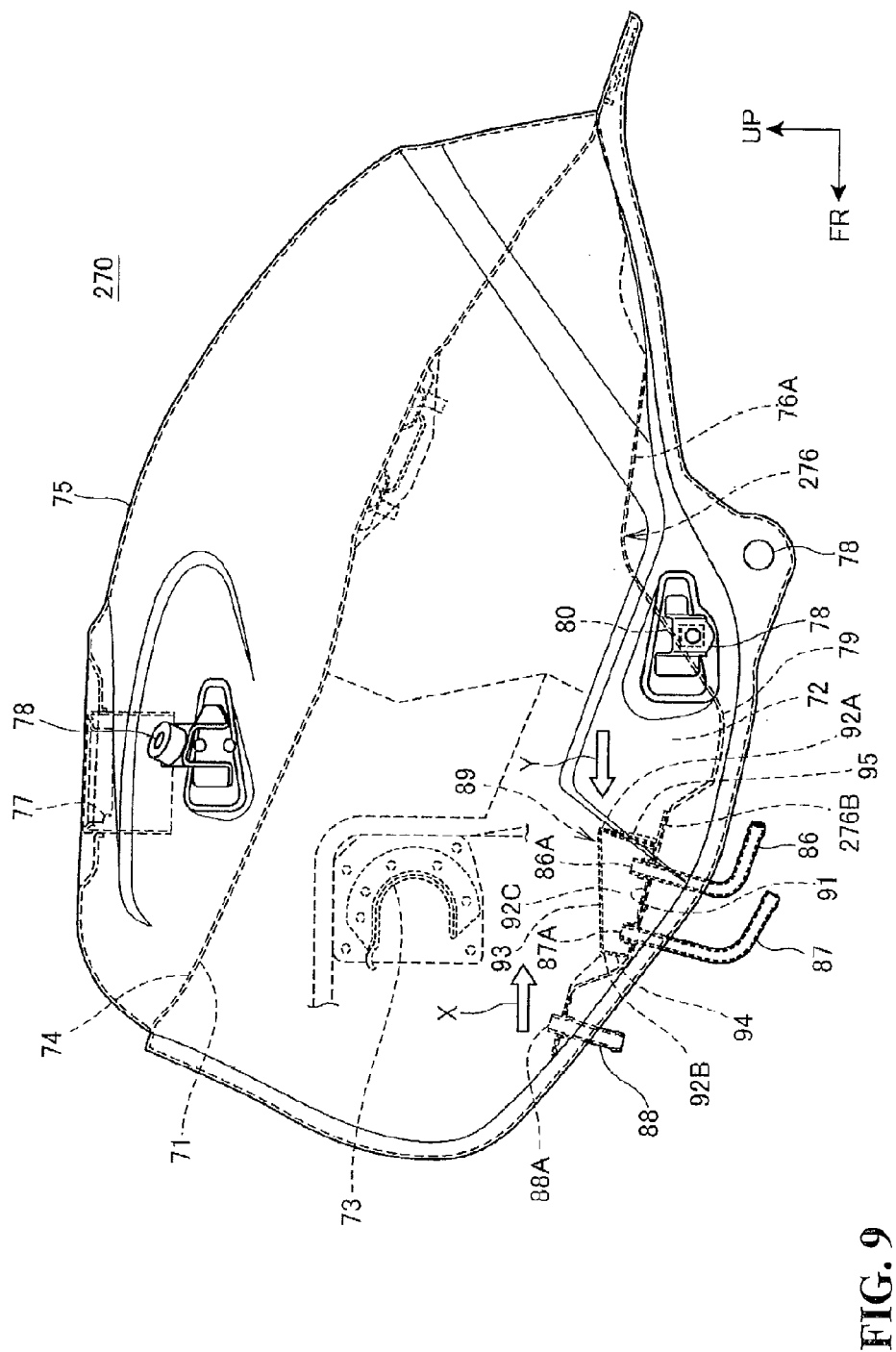
FIG. 9 is a left side view of a fuel tank according to a second embodiment.

FIG. 9 is a left side view of the fuel tank 270 according to the second embodiment.

The fuel tank 270 fixed to the main frame 13 has the left and right side reservoir portions 72. Each of the side reservoir portions 72 has a side bottom plate portion 276 (a fuel tank bottom) constituting the bottom thereof. The side bottom plate portion 276 has the rear bottom plate portion 76A located above the throttle body 41 (FIG. 2), and a front bottom plate portion 276B located above the head cover 35 (FIG. 2). The lowermost end 79 of the side reservoir portion 72 is provided on the front bottom plate portion 276B, at a longitudinally intermediate portion of the fuel tank 270. The side bottom plate portion 276, forwardly of and to the rear of the lowermost end 79, is inclined downwardly toward the lowermost end 79.

The sub-chamber 89 is disposed such that the front wall 92A is located toward the lowermost end 79. The opening 94 in the rear wall 92B is disposed facing toward the vehicle front. The front wall 92A is higher than the rear wall 92B.

The fuel-supply tube connecting pipe 86, the fuel return tube connecting pipe 87, and the air bubble return tube connecting pipe 88 are provided on the front bottom plate portion 276B. The fuel suction port 86A and the fuel return port 87A are provided within the sub-chamber 89. The fuel return port 87A is provided forwardly of the fuel suction port 86A, and the fuel suction port 86A is provided between the fuel return port 87A and the lowermost end 79.

The air bubble return tube connecting pipe 88 is provided forwardly of the fuel return port 87A, outside of the sub-chamber 89, above the fuel suction port 86A.

When the motorcycle 1 is decelerated in a state in which the fuel remaining within the fuel tank 270 is low, the fuel moves forward as indicated by arrow Y in FIG. 9, and consequently the fluid level at the front of the side reservoir portions 72 is raised. Then the fuel moves rearwardly in the direction of arrow X in response to the end of deceleration or the acceleration. A portion of the fuel moved rearwardly, flows into the sub-chamber 89 through the opening 94 or the opening portion 93 of the sub-chamber 89 and accumulates in the sub-chamber 89. In this manner, when the remaining fuel is low, it is possible to cause the fuel to flow into the sub-chamber 89 through the opening 94 in the front of the sub-chamber 89 and accumulate in the sub-chamber 89 by utilizing a fluid level change caused at the time of the acceleration after deceleration of the motorcycle 1, so that the fuel in the sub-chamber 89 can be supplied to the fuel suction port 86A. Therefore, even in a low remaining fuel condition, the effective supply of fuel to the fuel pump 50 can be performed.

Furthermore, the sub-chamber 89 has the wall 92 that surrounds the fuel suction port 86A. Also, the front wall 92A located toward the lowermost end 79 of the side bottom plate portion 276 of the fuel tank 270 in the vehicle front-rear direction is the highest. Thus, the front wall 92A located toward the lowermost end 79 can receive the fuel changed in fluid level at the time of the acceleration after deceleration of the motorcycle 1, thereby allowing efficient accumulation in the sub-chamber 89 of fuel.

Hereinafter, a third embodiment to which the present invention is applied will be described with reference to FIG. 10, in which the same elements as the first embodiment are denoted by the same reference signs, and the description thereof will not be repeated.

In the above-described first embodiment, the fuel suction port 86A is provided in the fuel-supply tube connecting pipe 86 connected to the fuel pump 50, while, in the third embodiment, an upper fuel suction port 387A and a lower fuel suction port 387B (fuel suction ports) are provided on a fuel cock 386 that is connected to a carburetor (not shown) serving as an intake system component. This is the principal difference between the first embodiment and the third embodiment.

In the construction according to the third embodiment, fuel is supplied to the engine 30 by the carburetor (not shown) in place of the throttle body 41 (FIG. 2). The above-described carburetor is disposed at the same location as the throttle body 41. Also, the fuel injection device 44 and the fuel pump 50 are not disposed.

Figure 10:
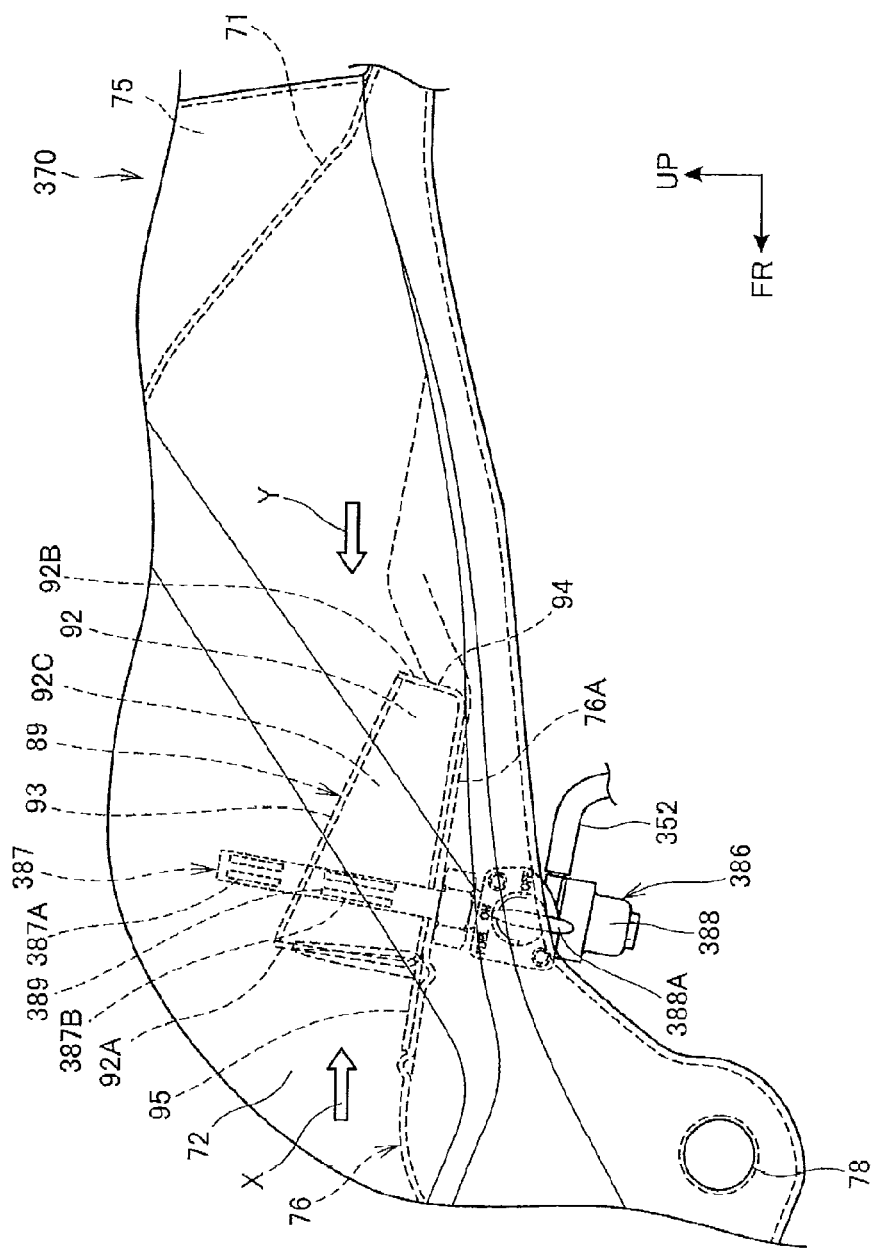
FIG. 10 is a side view showing a connection of a fuel cock of a fuel tank according to a third embodiment.

FIG. 10 is a side view showing a connection of the fuel cock 386 of a fuel tank 370 according to the third embodiment.

The fuel tank 370 fixed to the main frame 13 has the left and right side reservoir portions 72. Each of the side reservoir portions 72 has the side bottom plate portion 76 constituting the bottom thereof.

The rear bottom plate portion 76A of the side bottom plate portion 76 is provided with the fuel cock 386 that sucks the fuel in the fuel tank 370 to feed it to the carburetor. The rear bottom plate portion 76A is also provided with the sub-chamber 89.

The fuel cock 386 has a suction pipe 387 that protrudes inwardly of the side reservoir portion 72; and a connection 388 that is provided below the rear bottom plate portion 76A, outside of the fuel tank 370. The above-described carburetor is connected to the fuel cock 386 through a fuel-supply tube 352 that is connected to the connection 388.

The suction pipe 387 has the upper fuel suction port 387A and the lower fuel suction port 387B which are formed at upper and lower portions thereof, respectively. The connection 388 has a switch cock 388A for switching between open and closed positions of the upper fuel suction port 387A and the lower fuel suction port 387B by a turning operation. More specifically, when the cock 388A is in the "on" position for normal use, the upper fuel suction port 387A is open and the lower fuel suction port 387B is closed so that the fuel sucked from the upper fuel suction port 387A is supplied to the carburetor.

When the cock 388A is in the "reserve" position for use in a low fuel condition, the upper fuel suction port 387A is closed and the lower fuel suction port 387B is open so that the fuel sucked from the lower fuel suction port 387B is supplied to the carburetor.

When the vehicle runs out of gas in the "on" position of the cock 388A, the rider switches the cock 388A to the "reserve" position, so that the reserve fuel below the upper fuel suction port 387A can be sucked through the lower fuel suction port 387B to be supplied to the carburetor. In other words, the lower fuel suction port 387B serves as a reserve fuel suction port. The area of the fuel cock 386 within the fuel tank 370, which is below an upper end 389 of the lower fuel suction port 387B, serves as a reservoir area for sucking reserve fuel.

The suction pipe 387 is provided in the vicinity of the front wall 92A within the sub-chamber 89. More specifically, the wall 92 of the sub-chamber 89 is elevated above the upper end 389 of the lower fuel suction port 387B, and formed up to a position elevated above the reservoir area. The upper fuel suction port 387A is located above the wall 92 of the sub-chamber 89.

When the motorcycle 1 is accelerated in a state in which the fuel remaining within the fuel tank 370 is low, the fuel moves rearwardly as indicated by arrow X in FIG. 10, and consequently the fluid level in the rear of the side reservoir portions 72 is raised. Then the fuel moves forward in the direction of arrow Y in response to the end of acceleration or the deceleration. A portion of the fuel moved in a forward direction flows into the sub-chamber 89 through the opening 94 or the opening portion 93 of the sub-chamber 89 and accumulates in the sub-chamber 89.

In the third embodiment, the wall 92 of the sub-chamber 89 is formed up to a position elevated above the reservoir area. Thus, the fuel accumulated in the sub-chamber 89 can be effectively supplied to the lower fuel suction port 387B, and, even in a low remaining fuel condition, the supply of fuel to the carburetor can be performed.

It should be understood that the above-described third embodiment is given to illustrate an aspect to which the present invention is applied, and the present invention is not limited to the above-described third embodiment.

While, in the above-described third embodiment, the area below the upper end 389 of the lower fuel suction port 387B serves as the reservoir area, the present invention is not limited thereto. Alternatively the area below a lower end of the upper fuel suction port 387A may serve as the reservoir area, and the wall 92 of the sub-chamber 89 may be extended upwardly above the lower end of the upper fuel suction port 387A.

Furthermore, in the above-described third embodiment, the sub-chamber 89 is provided toward the vehicle rear with respect to the lowermost end 79, with the opening 94 facing rearward, and the lower fuel suction port 387B is provided within the sub-chamber 89. However, the present invention is not limited thereto. In the same manner as the above-described second embodiment, the arrangement may be such that the sub-chamber 89 is provided toward the vehicle front with respect to the lowermost end 79, with the opening 94 facing forward; the lower fuel suction port 387B is provided within the sub-chamber 89; and the wall 92 is formed up to a position elevated above the reservoir area of the fuel cock 386.

Hereinafter, a fourth embodiment to which the present invention is applied will be described with reference to FIG. 11, in which the same elements as the first embodiment are denoted by the same reference signs, and the description thereof will not be repeated.

In the above-described first embodiment, the air bubble return port 88A is located the height H1 above the fuel suction port 86A, while, in the fourth embodiment, an air bubble return port 488A is provided so as to be located above the sub-chamber 89. This is where the fourth embodiment differs from the first embodiment.

Figure 11:
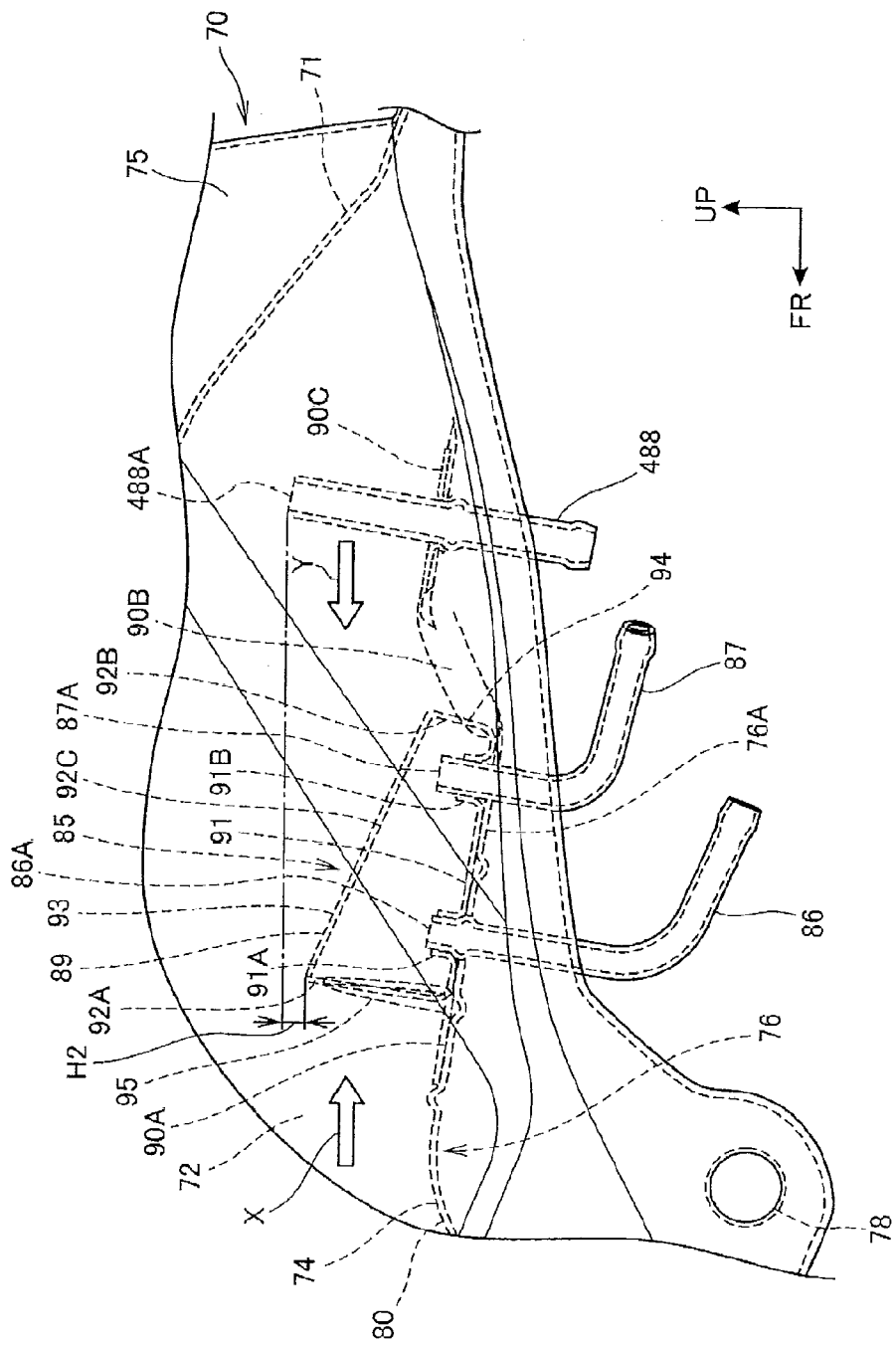
FIG. 11 is a left side view of a fuel tube connection according to a fourth embodiment.

FIG. 11 is a left side view of the fuel tube connection 85 according to the fourth embodiment.

In the fourth embodiment, there is provided an air bubble return tube connecting pipe 488 in place of the air bubble return port 88A in the first embodiment. The air bubble return tube 53 (FIG. 3) is connected to the air bubble return tube connecting pipe 488. The upper end of the air bubble return tube connecting pipe 488 serves as the air bubble return port 488A for returning air bubbles from the fuel pump 50 to the fuel tank 70. The air bubble return port 488A opens at a position elevated predetermined height H2 above the front wall 92A that is the highest of the walls of the sub-chamber 89.

In the fourth embodiment, the air bubble return port 488A is provided above the sub-chamber 89. Thus, it is possible to prevent the entry of the air bubbles from the air bubble return port 488A into the sub-chamber 89, and prevent the air bubbles from being sucked into the fuel suction port 86A located within the sub-chamber 89. Therefore, even in a low remaining fuel condition, the effective supply of fuel to the fuel pump 50 can be performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank for use with a saddle-ride vehicle comprising:
    an engine having a cylinder disposed on a crankcase and an intake system component disposed at the rear of the cylinder for sucking air into the engine, said fuel tank being disposed above the engine for storing fuel to be consumed by the engine;
    a fuel suction port being positioned in a bottom of the fuel tank for feeding the fuel to the intake system component; and
    fuel collecting means having a wall surrounding the fuel suction port, the fuel collecting means having a fuel flow opening toward a rear of the vehicle;
    wherein the fuel collecting means is provided inside with a fuel return port for returning residual fuel in a fuel pump after operation to the fuel tank, the fuel pump sucking the fuel in the fuel tank and feeding the fuel to the intake system component.

2. The fuel tank for use with the saddle-ride vehicle according to claim 1, wherein the fuel suction port is located above a lowermost end of the bottom of the fuel tank, and the fuel suction port is located toward the rear of the vehicle with respect to the lowermost end.

3. The fuel tank for use with the saddle-ride vehicle according to claim 2, wherein the fuel collecting means is provided inside with a fuel return port for returning residual fuel in a fuel pump after operation to the fuel tank, the fuel pump sucking the fuel in the fuel tank and feeding the fuel to the intake system component.

4. The fuel tank for use with the saddle-ride vehicle according to claim 1, and further including a body frame positioned below the fuel tank, the body frame extending rearwardly from a head pipe with the fuel tank being disposed on the body frame.

5. The fuel tank for use with the saddle-ride vehicle according to claim 2, and further including a body frame positioned below the fuel tank, the body frame extending rearwardly from a head pipe with the fuel tank being disposed on the body frame.

6. The fuel tank for use with the saddle-ride vehicle according to claim 1, wherein the fuel collecting means includes a highest wall portion, the wall portion being located toward a lowermost end of the bottom of the fuel tank in a vehicle front-rear direction.

7. The fuel tank for use with the saddle-ride vehicle according to claim 2, wherein the fuel collecting means includes a highest wall portion, the wall portion being located toward the lowermost end of the bottom of the fuel tank in a vehicle front-rear direction.

8. The fuel tank for use with the saddle-ride vehicle according to claim 1, wherein the fuel pump is coupled through a pipe to a pressure regulator that is separate from the fuel pump, and the fuel after passing through the pressure regulator is fed to a fuel injection device, while residual fuel in the pressure regulator is fed to the fuel return port through the pipe.

9. The fuel tank for use with the saddle-ride vehicle according to claim 1, wherein the fuel return port together with the fuel suction port is provided within the fuel collecting means, the fuel suction port being provided between the fuel return port and a lowermost end of the bottom of the fuel tank in a vehicle front-rear direction.

10. The fuel tank for use with the saddle-ride vehicle according to claim 2, wherein the fuel return port together with the fuel suction port is provided within the fuel collecting means, the fuel suction port being provided between the fuel return port and the lowermost end of the bottom of the fuel tank in a vehicle front-rear direction.

11. The fuel tank for use with the saddle-ride vehicle according to claim 1, wherein the fuel suction port is provided in a fuel pipe, the fuel pipe being coupled to the fuel pump provided below the fuel tank, the fuel pump having a pump body and a case, the case containing a fuel reservoir chamber.

12. The fuel tank for use with the saddle-ride vehicle according to claim 2, wherein the fuel suction port is provided in a fuel pipe, the fuel pipe being coupled to the fuel pump provided below the fuel tank, the fuel pump having a pump body and a case, the case containing a fuel reservoir chamber.

13. The fuel tank for use with the saddle-ride vehicle according to claim 11, wherein an air bubble return port is provided in the bottom of the fuel tank outwardly of the fuel collecting means for returning air bubbles generated within the fuel reservoir chamber by the fuel pump back into the fuel tank.

14. The fuel tank for use with the saddle-ride vehicle according to claim 1, wherein the fuel suction port is provided in a fuel cock, and the fuel collecting means is elevated above a reservoir area of the fuel cock.

15. The fuel tank for use with the saddle-ride vehicle according to claim 1, wherein the opening is provided closer to the fuel return port than the fuel suction port.

16. The fuel tank for use with the saddle-ride vehicle according to claim 1, wherein the fuel return port is provided toward the opening with respect to the fuel suction port, and the fuel return port and the fuel suction port are arranged in the vehicle front-rear direction.

17. The fuel tank for use with the saddle-ride vehicle according to claim 13, wherein the air bubble return port is provided at a position elevated above the fuel collecting means.

18. A fuel tank for use with a saddle-ride vehicle having an engine with a cylinder disposed on a crankcase and an intake system component disposed at the rear of the cylinder for sucking air into the engine, said fuel tank being disposed above the engine for storing fuel to be consumed by the engine comprising:
- a fuel suction port in a bottom of the fuel tank for feeding the fuel to the intake system component; and
- fuel collecting means having a wall surrounding the fuel suction port, the fuel collecting means having a fuel flow opening toward a front of the vehicle;
- wherein the fuel collecting means is provided inside with a fuel return port for returning residual fuel in a fuel pump after operation to the fuel tank, the fuel pump sucking the fuel in the fuel tank and feeding the fuel to the intake system component.

19. The fuel tank for use with the saddle-ride vehicle according to claim 18, wherein the fuel suction port is located above a lowermost end of the bottom of the fuel tank, and the fuel suction port is located toward the vehicle front with respect to the lowermost end.

* * * * *